US008599318B2

(12) United States Patent
Astrachan et al.

(10) Patent No.: US 8,599,318 B2
(45) Date of Patent: Dec. 3, 2013

(54) CONTRAST CONTROL DEVICE AND METHOD THEREFOR

(75) Inventors: Paul M. Astrachan, Austin, TX (US); Chris A. Aardema, Austin, TX (US)

(73) Assignee: Vixs Systems, Inc., Toronto, Ontario (CA)

( * ) Notice: Subject to any disclaimer, the term of this patent is extended or adjusted under 35 U.S.C. 154(b) by 229 days.

(21) Appl. No.: 12/784,793

(22) Filed: May 21, 2010

(65) Prior Publication Data

US 2011/0285911 A1   Nov. 24, 2011

(51) Int. Cl.
  H04N 5/14     (2006.01)
  H04N 5/57     (2006.01)
  G06K 9/00     (2006.01)

(52) U.S. Cl.
  USPC .............................. 348/672; 348/687; 382/168

(58) Field of Classification Search
  USPC ........................... 348/607, 620, 659, 672, 687
  See application file for complete search history.

(56) References Cited

U.S. PATENT DOCUMENTS

| | | | |
|---|---|---|---|
| 5,862,254 A * | 1/1999 | Kim et al. ...................... | 382/168 |
| 6,018,588 A * | 1/2000 | Kim .............................. | 382/167 |
| 6,038,341 A * | 3/2000 | Takeshima et al. ............ | 382/168 |
| 6,130,724 A | 10/2000 | Hwang ........................ | 348/678 |
| 6,148,103 A * | 11/2000 | Nenonen ....................... | 382/169 |
| 6,373,533 B1 * | 4/2002 | Kawabata et al. ............ | 348/672 |
| 6,845,176 B1 * | 1/2005 | Sezan ........................... | 382/168 |
| 7,003,153 B1 | 2/2006 | Kerofsky | |
| 7,020,332 B2 * | 3/2006 | Nenonen et al. .............. | 382/169 |
| 7,102,695 B2 * | 9/2006 | Han et al. ....................... | 348/673 |
| 7,170,566 B2 * | 1/2007 | McGee et al. ................. | 348/722 |
| 7,248,743 B2 * | 7/2007 | Murakami ..................... | 382/251 |
| 7,289,667 B2 * | 10/2007 | Nenonen et al. .............. | 382/169 |
| 7,352,410 B2 | 4/2008 | Chou | |
| 7,386,181 B2 | 6/2008 | Murakami | |
| 7,394,932 B2 | 7/2008 | Kida et al. | |
| 7,626,639 B2 * | 12/2009 | Yamauchi ...................... | 348/607 |
| 7,777,816 B2 * | 8/2010 | Chang et al. .................. | 348/620 |
| 7,865,014 B2 * | 1/2011 | Wu et al. ....................... | 382/168 |
| 7,865,033 B2 * | 1/2011 | Han et al. ....................... | 382/274 |
| 7,940,333 B2 | 5/2011 | Suzuki | |
| 8,009,907 B1 * | 8/2011 | Srinivasan et al. ............ | 382/168 |
| 8,107,756 B2 | 1/2012 | Chen et al. | |
| 8,150,155 B2 * | 4/2012 | El-Maleh et al. ............. | 382/173 |
| 8,159,616 B2 * | 4/2012 | Norgaard ...................... | 348/672 |
| 8,174,623 B2 | 5/2012 | Chen et al. | |
| 8,295,596 B1 | 10/2012 | Srinivasan et al. | |
| 8,335,378 B2 | 12/2012 | Morimoto | |
| 2001/0052945 A1 * | 12/2001 | Stessen ......................... | 348/672 |

(Continued)

OTHER PUBLICATIONS

Kim, T. et al., "Adaptive Contrast Enhancement Using Gain-Controllable Clipped Histogram Equalization," IEEE Transactions on Consumer Electronics, vol. 54, No. 4, Nov. 2008, pp. 1803-1810.

(Continued)

Primary Examiner — Brian Yenke

(57) ABSTRACT

A first video picture is translated based upon a first translation matrix to adjust a contrast of the first video image. A second translation matrix is determined based upon a first histogram of a second video picture. A third translation matrix is determined based upon the first translation matrix and the second translation matrix, and the video picture is translated based upon the third translation matrix. The translation matrix can be determined using a histogram that has been adjusted using a clipped histogram equalization technique.

22 Claims, 12 Drawing Sheets

(56) References Cited

U.S. PATENT DOCUMENTS

| | | |
|---|---|---|
| 2004/0001165 A1 | 1/2004 | Shiota et al. |
| 2005/0031201 A1* | 2/2005 | Goh .............................. 382/169 |
| 2005/0200762 A1* | 9/2005 | Barletta et al. ................ 348/700 |
| 2006/0066756 A1* | 3/2006 | Yamagishi et al. ............ 348/672 |
| 2007/0183661 A1* | 8/2007 | El-Maleh et al. ............. 382/173 |
| 2008/0037866 A1 | 2/2008 | Na |
| 2010/0214478 A1* | 8/2010 | Miyazawa .................... 348/553 |
| 2010/0245608 A1* | 9/2010 | Trudeau et al. ............. 348/222.1 |
| 2010/0246965 A1* | 9/2010 | Epshtein et al. .............. 382/187 |
| 2011/0142282 A1* | 6/2011 | Srikrishnan et al. .......... 382/103 |
| 2011/0285913 A1 | 11/2011 | Astrachan |

OTHER PUBLICATIONS

"Histogram Equalization," Wikipedia, downloaded Jun. 6, 2013, URL: <<http://en.wikipedia.org/wiki/Histogram_equalization>>, 7 pgs.

Non-Final Office Action mailed Jan. 7, 2013 for U.S. Appl. No. 13/182,801, 23 pages.

Final Office Action mailed Apr. 25, 2013 for U.S. Appl. No. 13/182,801, 26 pages.

* cited by examiner

CONTRAST CONTROL DEVICE AND METHOD THEREFOR

FIELD OF THE DISCLOSURE

The present disclosure relates generally to video processing and more particularly to translation of a video picture.

BACKGROUND

Video systems often allow for the contrast of a video stream to be adjusted by translating pictures of the video stream by spreading the dynamic range of the individual pictures of the video stream. However, spreading of the dynamic range of the pictures can result in the amplification of noise that results in a degradation of a video image as perceived by a user. A method of increasing the contrast of a video image while maintaining an appealing image would be useful.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-11 illustrate exemplary devices and techniques for implementing contrast control by a video processor. In one embodiment of the present disclosure, a translation matrix is determined based upon a current translation matrix and a previous translation matrix and used to adjust a current video picture of a video stream. The current translation matrix is based solely upon a current video picture being processed, while the previous translation matrix is the translation matrix for a previous video picture, such as the video picture that is displayed immediately prior to the current video picture, and can be based upon one or more video pictures. In a specific implementation, the translation matrix used to perform histogram equalization for the current video picture represents a moving average of a sequence of translation matrices.

In another embodiment of the present disclosure, the current translation matrix is determined based upon a clipped histogram technique that redistributes a number of histogram points for a received video picture, referred to as clipped points, that are identified a clip line of a luminance histogram for a video picture. The location of the clip line is referred to herein as a final clip line, and is determined based upon a predetermined number of points that indicate a desired number of histogram points to be clipped. In accordance with a specific embodiment, the location of the final clip line of a histogram of a received video picture is determined by concurrently calculating the number of points identified as clipped by each clip line of a plurality of clip lines. Once the final clip line is determined, the points identified as clipped by the final clip line are removed and redistributed to adjust the histogram of the received video picture. The adjusted histogram, that is the histogram with the redistributed points, is then used to determine a translation matrix used to translate the received video picture to adjust its contrast.

Figure 1:
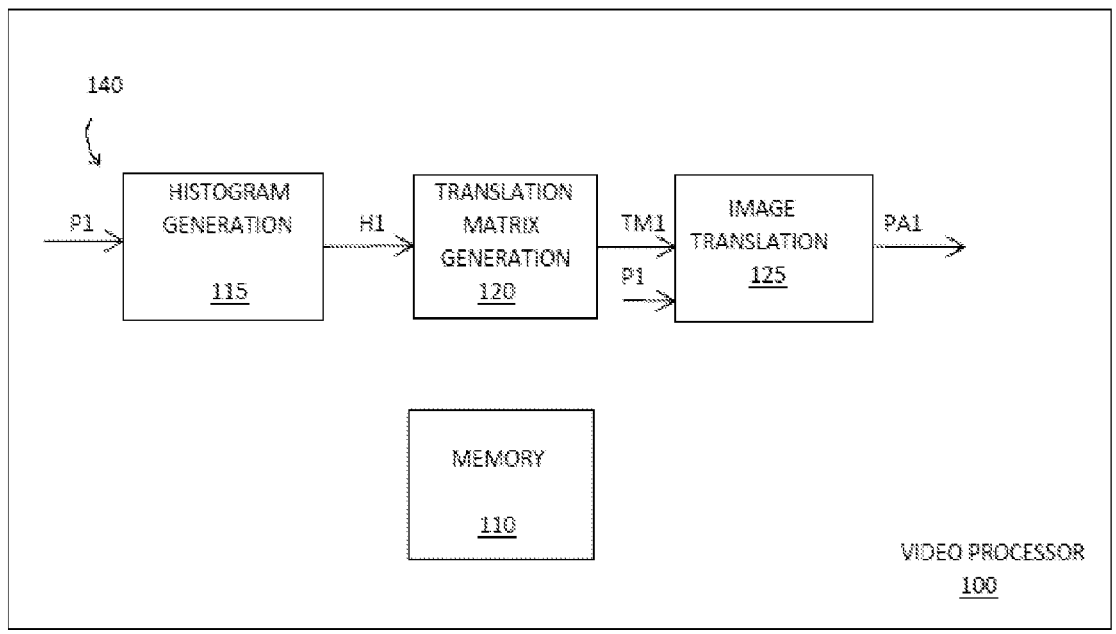
FIG. 1 is a block diagram illustrating a video processor employing video translation enhancements in accordance with at least one embodiment of the present disclosure.

FIG. 1 illustrates a video processor 100 employing contrast control techniques in accordance with at least one embodiment of the present disclosure. The video processor 100 includes a memory 110 and a contrast module 140 that can translate a video stream to implement contrast control. The contrast module 140 includes a histogram generation module 115, a translation matrix generation module 120, and an image translation module 125. The functionality of the various modules of the video processor 100 can be implemented as hardware, firmware, one or more processors executing corresponding software, or a combination thereof. To illustrate, the functionality of certain components can be implemented as discrete circuitry, an application specific integrated circuit (ASIC), a field programmable gate array (FPGA), and the like, while other functions of certain components can be implemented by one or more processors of a processing system that execute software instructions. Further, some or all of the components can implemented in a processing device designed based on a set of register-transfer-level (RTL) or Verilog instructions that define the functionality of the processing device and which are synthesized to generate the electrical and electronic design of the processing device.

The memory 110 can be connected to various other modules (not shown) of the video processor 100 and can include one or more storage locations, such as frame buffers, to store video frame based information, and registers to store control information. The memory 110 can be disposed at an integrated circuit along with the contrast control module 140 or can reside entirely or partially apart from an integrated circuit that includes the contrast control module 140. In operation, the video processor 100 receives video data for a video stream via an input (not shown) and provides resulting contrastenhanced video data via an output (not shown). The memory 110 can buffer pixel data for a sequence of pictures of the video data and can be accessed by the various modules of the video processor 100. For purposes of discussion, it is assumed that the received video data represents a plurality of video pictures, and that each video picture is a video frame that includes both odd and even lines of pixel data for an image associated with the picture that is to be displayed.

The histogram generation module 115 receives a video frame, labeled P1, from memory 110 and determines an equalized histogram H1 based on video frame P1. One skilled in the art will appreciate that the data flow information illustrated at FIG. 1 between various components herein can be accomplished indirectly, such as by storing and retrieving information via memory 110.

The equalized histogram H1 can be based upon a histogram of the frame P1 referred to here in as H[P1]. The histogram of frame P1 can be represented as $N_k$, where: $N_k$ is the number of pixels of frame P1 with luminance $Y_k$; and k is an index value from 0 to L-1, where L is equal to the number of possible luminance values in the frame P1, and, therefore, k corresponds to possible luminance values of the video frame P1. For example, in one embodiment L is equal to 256, and for a value of k equal to 14, $Y_{14}$ represents a luminance of 14, and $N_{14}$ would represent the number of pixels in a frame having a luminance of 14.

Figure 2:
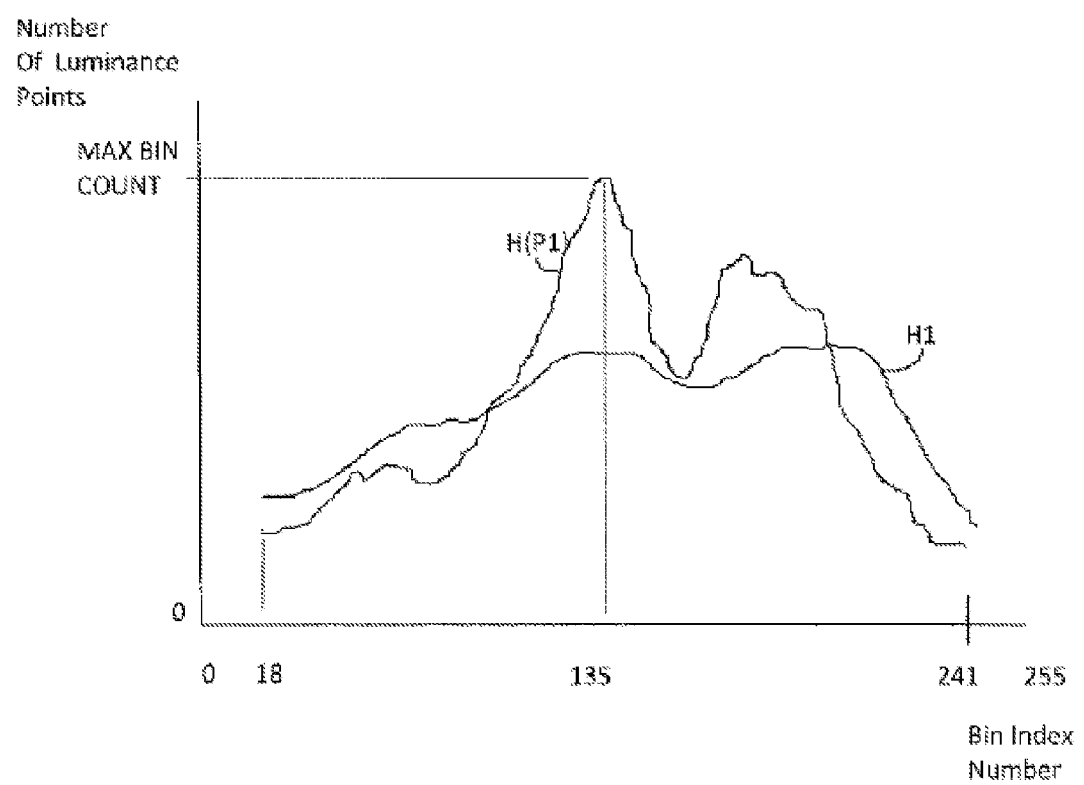
FIG. 2 a graphical representation of a histogram for a video picture in accordance with at least one embodiment of the present disclosure.

FIG. 2 illustrates a graph including a histogram H[P1] of the received video frame P1, and an equalized histogram H1 based upon the histogram H[P1]. The video frame P1 has 256 possible luminance values (L) from 0 to 255, as indicated by the x-axis values. A particular index value along the x-axis is reference a particular luminance bin, or bin. Thus there are 256 luminance bins, $B_0$ to $B_{255}$, for a particular frame. The number of pixels of video frame P1 associated with a particular luminance value, or bin, is indicated along the y-axis, and can be referred to as points, such as luminance points or histogram points. Bins $B_0$-$B_{17}$, and $B_{242}$-$B_{255}$ are particularly illustrated to have no points associated with them. Bin $B_{135}$ is particularly illustrated to have the most points, MAX_BIN_COUNT.

Figure 3:
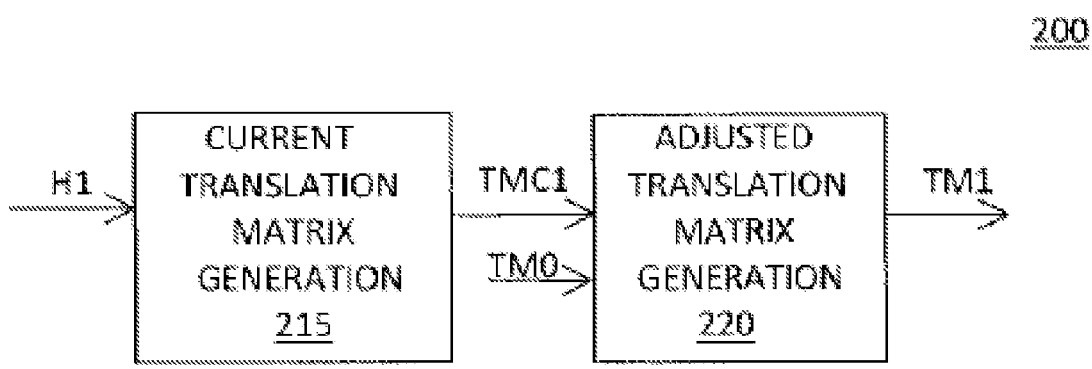
FIG. 3 is a block diagram illustrating an example implementation of a translation matrix generation module of FIG. 1 in accordance with at least one embodiment of the present disclosure.

The translation matrix generation module 120 of FIG. 1 receives the equalized histogram H1 determined by the histogram generation module 115 and determines a translation matrix TM1 based upon the histogram H1 that will be used by the image translation module 125 to translate the video frame P1. FIG. 3 illustrates an embodiment of a translation matrix generation module 200 that is a specific embodiment of the translation matrix generation module 120. Translation matrix generation module 200 includes a current translation matrix generation module 215, and a translation matrix adjust module 220.

The current translation matrix generation module 215 receives the histogram H1 and determines a current translation matrix TMC1, which is a translation matrix based solely on the current video frame P1. One skilled in the art will recognize that there are many techniques that can be used to determine the translation matrix TMC1 based upon a histogram of a particular video frame. In accordance with a specific embodiment described herein, the current translation matrix generation module 215 implements median split processing to generate the translation matrix TMC1 having two distinct regions, one above the median luminance bin and one below.

The region of the current translation matrix TMC1 below the luminance bin is referred to as $TM_B$, and the region of the current translation matrix TMC1 above the luminance bin is referred to as $TM_A$. The lower portion $TM_B$ of the translation matrix is determined by the current translation matrix generation module 215 based upon Equation 1:

$$TM_B[i]=((CDF[i]-CDF[FIRST\_NZ\_BIN])*ACTIVE\_BINS\_BELOW\_MEDIAN\_BIN)/PNTS\_BELOW\_MEDIAN\_BIN)+START\_BIN \quad \text{(Equation 1)}.$$

In Equation 1, i is an index having a value in the range of 0 to (MEDIAN_BIN—1) that corresponds to a luminance bin index, where MEDIAN_BIN is the index of the median bin of the histogram H1; CDF[i] is the value of the cumulative distribution function for bin $B_i$; CDF[FIRST_NZ_BIN] is the value of the cumulative distribution function for the lowest non-zero luminance bin, having the index FIRST_NZ_BIN that is lower than MEDIAN_BIN; ACTIVE_BINS_BELOW_MEDIAN_BIN is equal to MEDIAN_BIN—FIRST_NZ_BIN; PNTS_BELOW_MEDIAN_BIN is the number of points in the bins below the median bin; and START_BIN is a user provided value that indicates the lowest luminance value to occur when the received image is translated by the translation matrix TM.

The upper portion $TM_A$ of the translation matrix TMC1 is determined by the current translation matrix generation module 215 based upon the equation 2:

$$TM[i]=((CDF[i])-CDF[LAST\_NZ\_BIN])*ACTIVE\_BINS\_ABOVE\_MEDIAN\_BIN)/PNTS\_ABOVE\_MEDIAN\_BIN)+START\_BIN \quad \text{(Equation 2)}.$$

In Equation 2, MEDIAN_BIN is the index of the median bin; L is the total number of luminance bins; i is an index having a value in the range of (MEDIAN_BIN+1) to (L-1) that corresponds to a luminance bin index; CDF[LAST_NZ_BIN] is the value of the cumulative distribution function for the lowest non-zero luminance bin, having the index LAST_NZ_BIN that is greater than MEDIAN_BIN; ACTIVE_BINS_ABOVE_MEDIAN_BIN is the number of bins above the median bin as defined by (LAST_NZ_BIN)–MEDIAN_BIN; PNTS_ABOVE_MEDIAN_BIN is the number of points in the bins above the median bin; and START_BIN is the user provided value described above. The current translation matrix TMC1 is determined by the combination of Equations 1 and 2 is stored at memory 110.

Translation matrix adjust module 220 can be a statistical calculation module that statistically calculates the translation matrix TM1 based upon a statistical calculation that uses the current translation matrix TMC1 and a previous translation matrix TM0, where the previous translation matrix TM0 is the translation matrix used to translate a previous video frame P0 that is for display prior to video frame P1. For example, video frame P0 can be the video frame to be displayed immediately prior to video frame P1. The statistical calculation can be a statistical average that adjusts translation matrix TMC1 based upon one or more previous translation matrices to determine TM1. For example, translation matrix adjust module 220 can determine a moving average that determines the translation matrix TM1 based upon Equation 3:

$$TM[i]=TM_{CUR}[i]*(AVE)+TM_{PREV}[i]*(1-AVE) \quad \text{(Equation 3)}.$$

In Equation 3, TM is the translation matrix that will be used to translate a current video frame; $TM_{CUR}$ is the translation matrix that is based solely upon the histogram H1 of the current video frame, e.g., TMC1; $TM_{PREV}$ is the translation matrix that was used to translate a previous video frame, e.g., video frame TM0; and AVE is a coefficient that is less than or equal to one, and is used to weight the translation matrix $TM_{CUR}$ relative to the previous translation matrix $TM_{PREV}$. The translation matrix TM is stored at memory 110 and corresponds to the adjusted histogram TM1. One skilled in the art will appreciate that the histogram TM will become the previous translation matrix $TM_{PREV}$ for a next frame of video. In other words, the translation matrix TM is a translation matrix used to translate the current video frame, and is based upon a plurality of previous translations matrices, which themselves are based upon a plurality of luminance histograms.

The image translation module 125 (FIG. 1) receives the translation matrix TM1 and the current video frame P1, and translates the current video frame P1 based upon the adjusted translation matrix TM1 to determine a contrast adjusted frame PA1.

In a particular embodiment of the contrast module 140 of FIG. 1, the histogram generation module 115 implements a clipped histogram equalization technique that determines a final clip line for the histogram based upon a predetermined number of desired clipped points, and redistributes the clipped points throughout the histogram. For example, referring to the graph of FIG. 4, the histogram generation module 115 has determined based upon a predetermined desired number of points that the final clip line of histogram H[P1] is at the location FINAL_CLIP_POINT of the y-axis. The portion of the histogram H[P1] clipped by the final clip line is removed and redistributed. FIG. 5 illustrates a histogram generation module 300 that implements a particular clipped histogram equalization technique that is a specific embodiment of histogram generation module 115 of FIG. 1.

In accordance with a specific embodiment of the present disclosure, histogram generation module 300 includes a clip control module 310, a memory controller 312, a histogram redistribution module 314, a plurality of clip count modules 320, including clip count modules 321-323, and registers 3101-3106, 3141, 3201-3203, and 3206-3208.

The clip control module 310 receives the video frame P1, via memory control 312, and determines the histogram H[P1] for the video frame P1. The clip control module 310 accesses registers 3101 and 3102 to retrieve a value CLIP_% and a value PNTS_FRAME. These values are used to determine the desired number of points of histogram H[P1] to be redistributed, as indicated by Equation 4:

TPNTS_TO_REMOVE=(CLIP_%)*(PNTS_FRAME)  (Equation 4).

In Equation 4, the value CLIP_% indicates a percentage of the total points of a picture to be clipped from the luminance histogram H[P1], and the value PNTS_FRAME indicates the total number of points in the histogram H[P1], which corresponds to the number of points in the video frame P1. CLIP_% can be provided by a user, e.g., a user programmable value, and stored at register 3101. PNTS_FRAME can be determined based upon the resolution of a picture being processed as stored at register 3102. By example, the total number of points to be clipped from a picture represented by a frame having resolution of 1920×1080 (PNTS_FRAME) and a clipping percentage of 20% (CLIP_%) is 414,720 points, and is stored at register 3103 as variable TPNTS_TO_REMOVE.

In an alternate embodiment, the value CLIP_% of Equation 4 is not provided directly by a user, but instead varies based upon some characteristic of the histogram itself. For example, the clipping percentage CLIP_% can be adjusted to have a value below a maximum percentage (MAX_CLIP_%), which can be provided by a user, based upon the median or mean intensity of the video frame P1. For example, the clipping percentage CLIP_% can be determined by Equation 5:

CLIP_%=MAX_CLIP_%−($I_M$−$I_{offset}$)*SCALE  (Equation 5).

In Equation 5, $I_M$ is the mean or median luminance of the received frame, which can be calculated and stored at a register location of the video processor device 100 by the clip control module 310; $I_{offset}$, which can be provided by a user, is a value that defines a minimum luminance intensity value, below which no clipping will be allowed, and SCALE is the gain of the variable clipping being implemented. Note that the value of $I_M$−$I_{offset}$ is not allowed to be negative, and will instead be set to zero. One skilled in the art will appreciate that the clipping technique described herein can be implemented on multiple clipping zones of a histogram.

Figure 4:
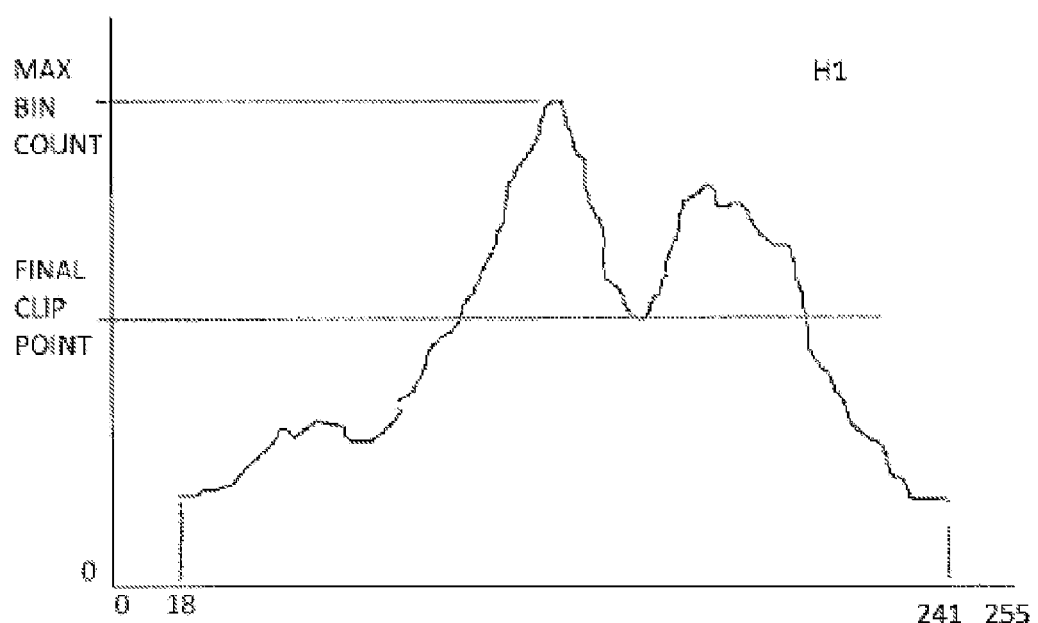
FIG. 4 a graphical representation of the histogram of FIG. 2 illustrating a final clip line in accordance with at least one embodiment of the present disclosure.
Figure 5:
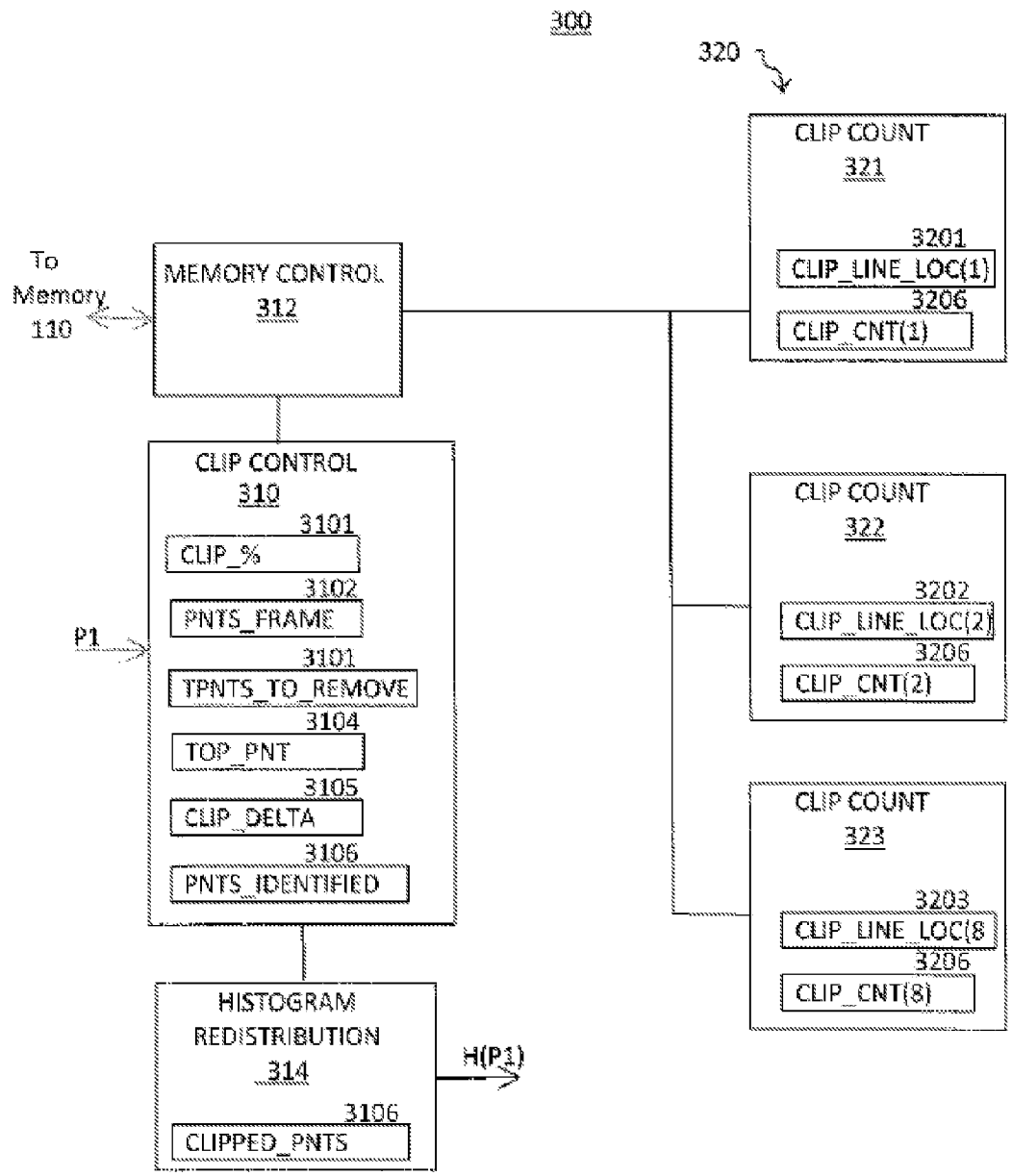
FIG. 5 is a block diagram illustrating an example implementation of a clipping module of the histogram generation module of FIG. 1 in accordance with at least one embodiment of the present disclosure.

In a specific example, 414,720 points of a 1920×1080 picture are to be clipped from the histogram of FIG. 4 and redistributed. Therefore, a final clip line at the histogram of FIG. 4 needs to be identified that clips 414,720 points. As noted previously, the final clip line at a location FINAL_CLIP_PNT of the histogram H1 is illustrated at FIG. 4 prior to actually being determined by the histogram generation module 115. Also, it will be appreciated that there may not be exactly 414,712 points identified by the FINAL CLIP LINE, and that instead the final clip line may be the clip line that clips the number of points closest to 414,720 points, the clip line that clips a number of points that is not more than 414,720, or a number of points that is not less than 414,720.

The clip control module 310 determines, and stores at register location 3104, a value CLIP_TOP that defines the location of a line at histogram H1 below which the final clip line is known to reside. The value of CLIP_TOP is initially set equal to the upper-most point of the histogram, MAX_BIN_COUNT, which can be determined by the control module 310 reading each of the luminance bins of the histogram to determine which luminance bin has the largest value.

The clip control module 310 determines a value CLIP_DELTA that is used to determine a plurality of clip lines. CLIP_DELTA is based upon the number of points of the histogram H1 that still need to be identified for clipping, as will be better understood herein, and is stored at register 3105. In accordance with a specific embodiment of the disclosure, CLIP_DELTA can be determined by clip control module 310 based upon Equation 6:

CLIP_DELTA=((TPNTS_TO_REMOVE−PNTS_IDENTIFIED)/L)+1)  (Equation 6).

In Equation 6, TPNTS_TO_REMOVE is the total number of points desired to be clipped and is stored at register 3103, PNTS_IDENTIFIED represents the total number points already identified for clipping and is stored at register 3106, and L represents the number of luminance levels (256) and itself can be a variable. Initially, no histogram points are identified for clipping, and, therefore, PNTS_IDENTIFIED is equal to 0, and the remaining number of points to be identified for removal (TPNTS_TO_REMOVE−PNTS_IDENTIFIED) is the same as TPNTS_TO_REMOVE. Therefore, based upon Equation 6, the initial value for CLIP_DELTA is 1621 when TPNTS_TO_REMOVE is equal to 414,720, and L equal to 256.

Clip control module 310 next determines a plurality of clip lines to be evaluated based upon CLIP_DELTA and stores the locations of the plurality of clip lines at a plurality of registers (3201-3203). The plurality of clip lines identified by the clip control module 310 will used in the process of identifying the final clip line of the histogram. In accordance with a specific embodiment, the locations of eight clip lines, CLIP_LINE_LOC[1 . . . 8], are determined by clip control module 310 based upon Equation 7:

CLIP_LINE_LOC[i]=CLIP_TOP−(CLIP_DELTA)(2**(8−i))  (Equation 7).

In Equation 7, CLIP_LINE_LOC[i] is the location of CLIP_LINE[i] along the y-index of the histogram, and i is an index having a value of 1 to 8 that indicates one of eight clip line locations being determined; CLIP_TOP is a location along the y-axis below which the final clip line is known to reside, as discussed previously. One skilled in the art will appreciate that more than eight clip lines can be determined, and that the term (2**(8−i)) doubles the spacing between each adjacent pair of clip lines of the plurality of clip lines. Therefore, the spacing between adjacent clip lines is non-linear based upon Equation 7. However, in other embodiments different equations can be used to determine the clip line locations, and the spacing between clip lines can be linear. The number of clipped points for each of the plurality of clip lines is stored at corresponding registers 3201-3203.

The locations of the clip lines determined using Equation 7 are stored at registers 3201-3203, and are used by the clip count modules 321-323 to concurrently determine how many points are clipped by each of the clip lines. In accordance with a specific embodiment of the disclosure, memory control module 312 can read the histogram of frame P1, referred to as histogram H[P1], from memory 110 a single time and in response provide the information to each of the plurality of clip control modules 320, which concurrently use the histogram information to determine the values CLIP_CNT[1 . . . 8]. The numbers of clipped points calculated by each of the clip count module 321-323 (CLIP_CNT[1 . . . 8]) are stored at corresponding registers 3206-3209. Clip control module 310 uses the clip counts CLIP_CNT[1 . . . 8] to determine if the final clip line has been identified for the histogram H[P1], or if another set of clip lines needs to be determined and evaluated. A particular technique for determining the final clip line of the histogram will be better understood with reference to the flow diagram of FIG. 6 as further discussed below.

After the final clip line is determined, the value of CLIPPED_POINTS, which is stored at register 3141, will indicate the actual number points clipped by the final clip line. One skilled in the art will appreciated that it is likely that no specific clip line will exist at histogram H[P1] that clips exactly the predetermined number of desired points, TPTS_TO_REMOVE, and that the final clip line can be selected to be the clip line that clips a number of points closest to the desired number of points, a clip line that clips at least the desired number of points, or the clip line that clips more than the desired number of points.

Figure 6:
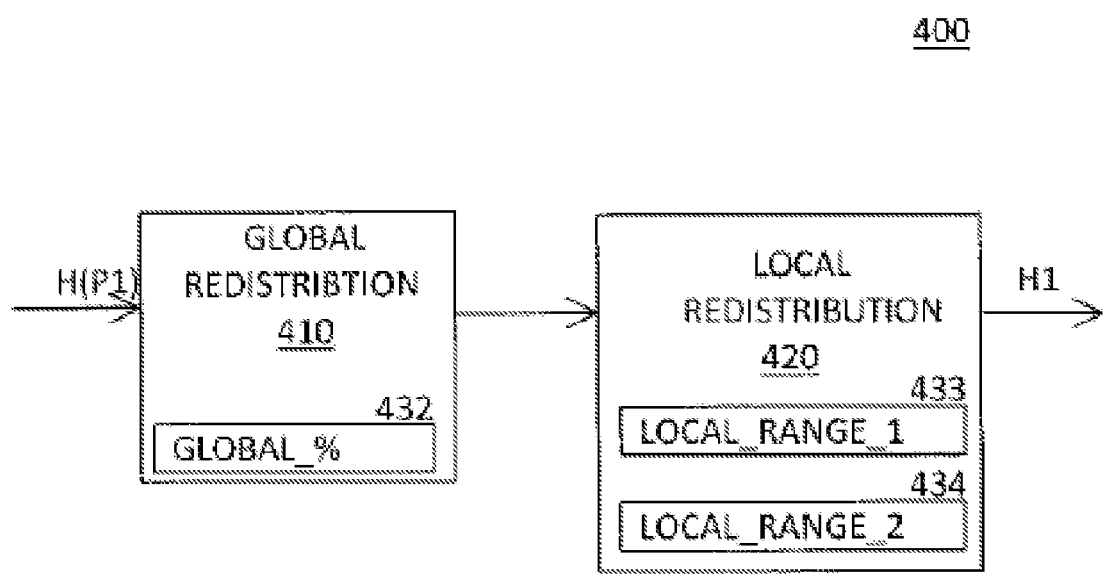
FIG. 6 is a block diagram illustrating an example implementation of a redistribution module of the histogram generation module of FIG. 1 in accordance with at least one embodiment of the present disclosure.

FIG. 6 illustrates an embodiment of a histogram redistribution module 400 that is a specific embodiment of the histogram redistribution module 314. The histogram redistribution module 400 adjusts the histogram H[P1] to determine the equalized histogram H1, which is generated by the histogram generation module 115, and used by the translation matrix generation module 120. Therefore, in a specific embodiment, the equalized histogram H1 is determined based upon a technique that redistributes points of the histogram H[P1] that are clipped by the final clip line as determined by the clip control module 310.

Histogram redistribution module 400 includes a global redistribution module 410, and a local redistribution module 420. The global redistribution module 410 allocates a percentage, GLOBAL_%, of the points clipped by the final clip line. For example, 248,832 points will be redistributed to the luminance bins $B_0$-$B_{255}$ of the histogram, assuming 414,720 points have been identified for clipping from a frame having a resolution of 1920×1080, and given a GLOBAL_% value of 60%. In accordance with one embodiment, global redistribution will place the same number of redistributed points in each luminance bin of the clipped histogram. Next, the local redistribution module 420 allocates the remaining points (416,720-248,832) identified for clipping to one or more local ranges of the histogram as specified by one or more registers. For example, registers 433 and 434 can each store a specific range of luminance bins to receive points being reallocated during local redistribution. The remaining clipped points can be redistributed equally, or redistributed within the local ranges based upon a weighting factor that can be fixed or user defined.

One skilled in the art will appreciate that according to a specific embodiment of the present disclosure that a clipped histogram equalization technique as describe above can be used to provide an equalized histogram to the translation matrix generation module 200 of FIG. 1. In an alternate embodiment, a clipped histogram equalization technique is not implemented by histogram generation module 115. Instead, a histogram equalization technique that does not use histogram clipping is used that can include any standard histogram equalization technique that modifies the histogram H[P1]. For example, an equalization technique can split the histogram into multiple portions based on a mean or median intensity, can recursively split portions of an image into smaller portions for processing, or can be a clipped histogram equalization technique that does not concurrently determine the clipped points for a plurality of clip lines.

One skilled in the art will further appreciate that according to another embodiment, a histogram clipping technique can be used along with an embodiment of a translation matrix generation module 120 that does not determine the translation matrix TM1 based upon a statistical calculation that uses one or more previous translation matrices as indicated at FIG. 3, but instead provides the translation matrix of the current video frame, TMC1, as the translation matrix TM1.

Figure 7:
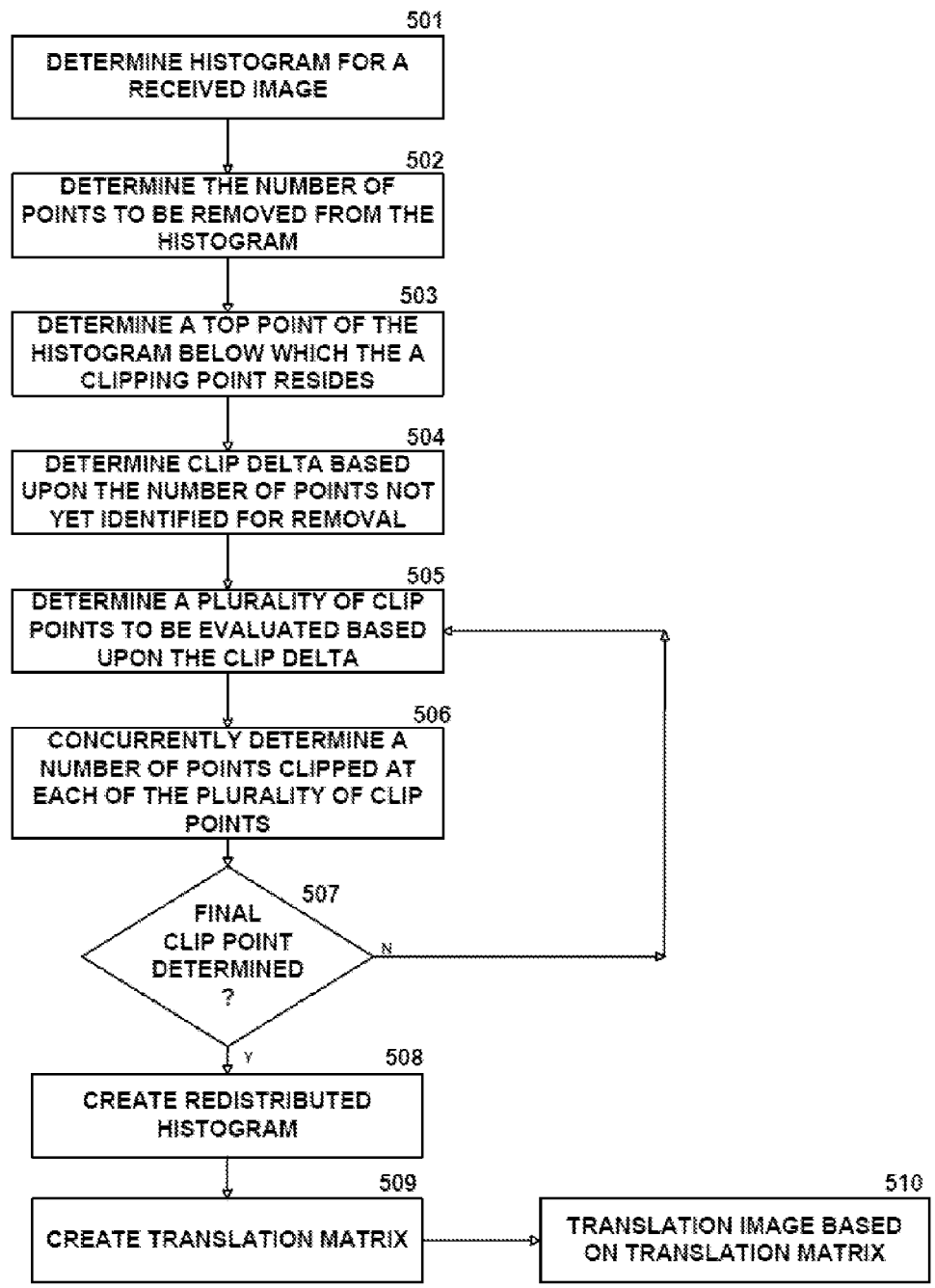
FIG. 7 is a flow diagram illustrating a video processing method in accordance with at least one embodiment of the present disclosure.

FIG. 7 illustrates a flow diagram of a method in accordance with the present disclosure that can be used to implement clipped histogram equalization. At node 501 of the flow diagram, a histogram is determined for a video frame. For example, a histogram H[P1] can be determined for a video frame P1 as previously described.

At node 502, the number of points desired to be clipped from the histogram H[P1] is determined as described above with reference to Equation 4. One skilled in art will appreciate that the amount of contrast adjustment implemented is based upon the number of points that are redistributed throughout the histogram as part of a histogram equalization technique.

At node 503, a top point of the histogram (CLIP_TOP) is identified. The value of CLIP_TOP location of a histogram H[P1] at or below which the final clip line is know to reside. The value of CLIP_TOP is initially set equal to MAX_BIN_COUNT (FIG. 2).

At node 504, a value of CLIP_DELTA is determined. CLIP_DELTA will be used determine a plurality of clip lines that will be evaluated in the process of identifying the final clip line. For example, CLIP_DELTA at node 504 is determined to be 1621 based on Equation 6 when the number of points of the histogram that have not yet been identified for clipping (PNTS_TO_REMOVE−PNTS_IDENTIFIED) is equal to 414,720 and L is equal to 256.

At node 505, a plurality of clip lines to be evaluated is determined. Table 1 indicates a plurality of clip line locations that have been determined based upon for clip lines CLIP_LINE[1 . . . 8] based upon Equation 7 when CLIP_DELTA is equal to 1621, and CLIP_TOP is equal to 220,000. The corresponding locations of CLIP_LINE[1 . . . 8] are referred to as CLIP_LINE_LOC[1 . . . 8], respectively. For example, the location of CLIP_LINE(1) is CLIP_LINE_LOC(1), which in Table 1 is equal to 12512.

TABLE 1

| CLIP LINE | CLIP LINE LOCATION |
|---|---|
| CLIP_LINE[1] | 12512 |
| CLIP_LINE[2] | 116256 |
| CLIP_LINE[3] | 168128 |
| CLIP_LINE[4] | 194064 |
| CLIP_LINE[5] | 207032 |
| CLIP_LINE[6] | 213516 |
| CLIP_LINE[7] | 216758 |
| CLIP_LINE[8] | 218379 |

At node 506, the numbers of points clipped by each of the plurality of clip lines is determined concurrently. For example, referring to FIG. 5, each one of the plurality of clip count modules 321-323 determines the number of points clipped by one of the plurality of clip lines as indicated at a corresponding register of registers 3201-3203. According to one embodiment, each of the plurality of clip count modules 320 can be a hardware module at in integrated circuit that: 1) receives histogram information from memory controller 312 that includes the number of points at each luminance bin of the histogram of FIG. 2; 2) determines the number of clipped points at each luminance bin of the histogram that is in excess of its corresponding clip line, where location of the corresponding clip lines are indicated at registers 3206-3208, and 3) maintains a cumulative number of the excess points at each luminance bin of the histogram, which, after each bin is evaluated, indicates the number of points of the histogram clipped by the clip line.

Each of the plurality of clip count modules 320 stores the number of clipped points for its corresponding clip line at a corresponding register 3206-3208. For example, clip count module 321 of FIG. 5 will access the value CLIP_LINE[1] stored at register 3201 and determine how many points of a histogram accessed by memory control module 312 are clipped by CLIP_LINE([1]. The number of points clipped by the clip line CLIP_LINE[1] is CLIP_CNT[1], which is stored at register 3206. Similarly, clip count modules 322 and 323 will determine and store the number of clipped points for their respective clip lines.

The amount of time needed to converge on the final clip line of histogram H[P1], and the bandwidth of the memory bus the memory control module 312 needs to access the histogram H[P1] for each of the plurality of clip count modules 320, can be reduced by evaluating multiple clip lines concurrently. For example, information for histogram H[P1] can be provided to each of the clip count modules 320 in response to a single read of the histogram H[P1] from memory 110 (FIG. 1) by memory control module 312 (FIG. 5). For example, the histogram H[P1] information that is accessed by the memory controller 312 can be provided to each of the plurality of clip count modules 320 simultaneously to allow each of the clip count modules 321-323 to concurrently calculate a clip count for a different clip line.

Figure 8:
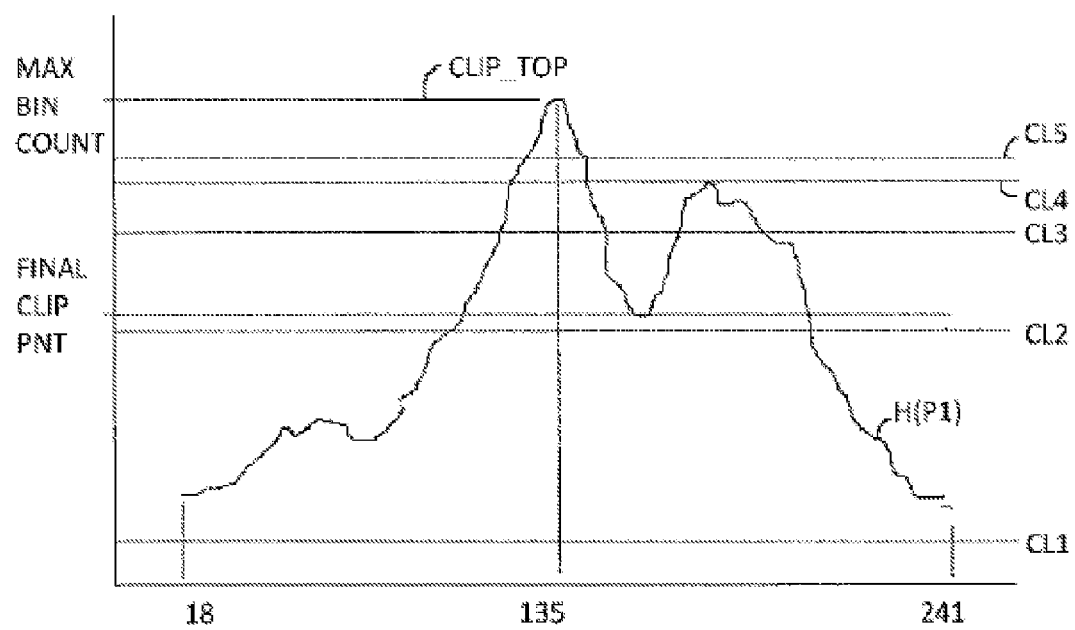
FIG. 8 is a graphical representation of the histogram of FIG. 4 illustrating plurality of clip points in accordance with at least one embodiment of the present disclosure.

FIG. 8 illustrates the locations of the top clip line, CLIP_TOP, and five of the plurality of clip lines indicated at Table 1, CLIP_LINE[1] through CLIP_LINE[5], which are labeled CL1 through CL5. Clip lines CL1 and CL2 clip more points from the histogram H[P1] than a desired number of points, and, therefore, are illustrated at FIG. 8 below the final clip line that is being determined. Clip lines CL3-CL5, and CL6-CL8 (not shown), clip less than a desired number of points from the histogram of FIG. 8, and therefore, are illustrated at FIG. 8 to be above the location of the final clip line.

A determination is made at node 507 of the flow diagram of FIG. 7, whether the final clipping point has been identified by the current set of clip lines CL1-CL8. Flow proceeds to node 505 if the final clip point has not been identified, otherwise, flow proceeds to node 508. A particular embodiment of node 507 for determining whether the final clipping point has been identified is illustrated by the flow diagram of FIG. 9.

Figure 9:
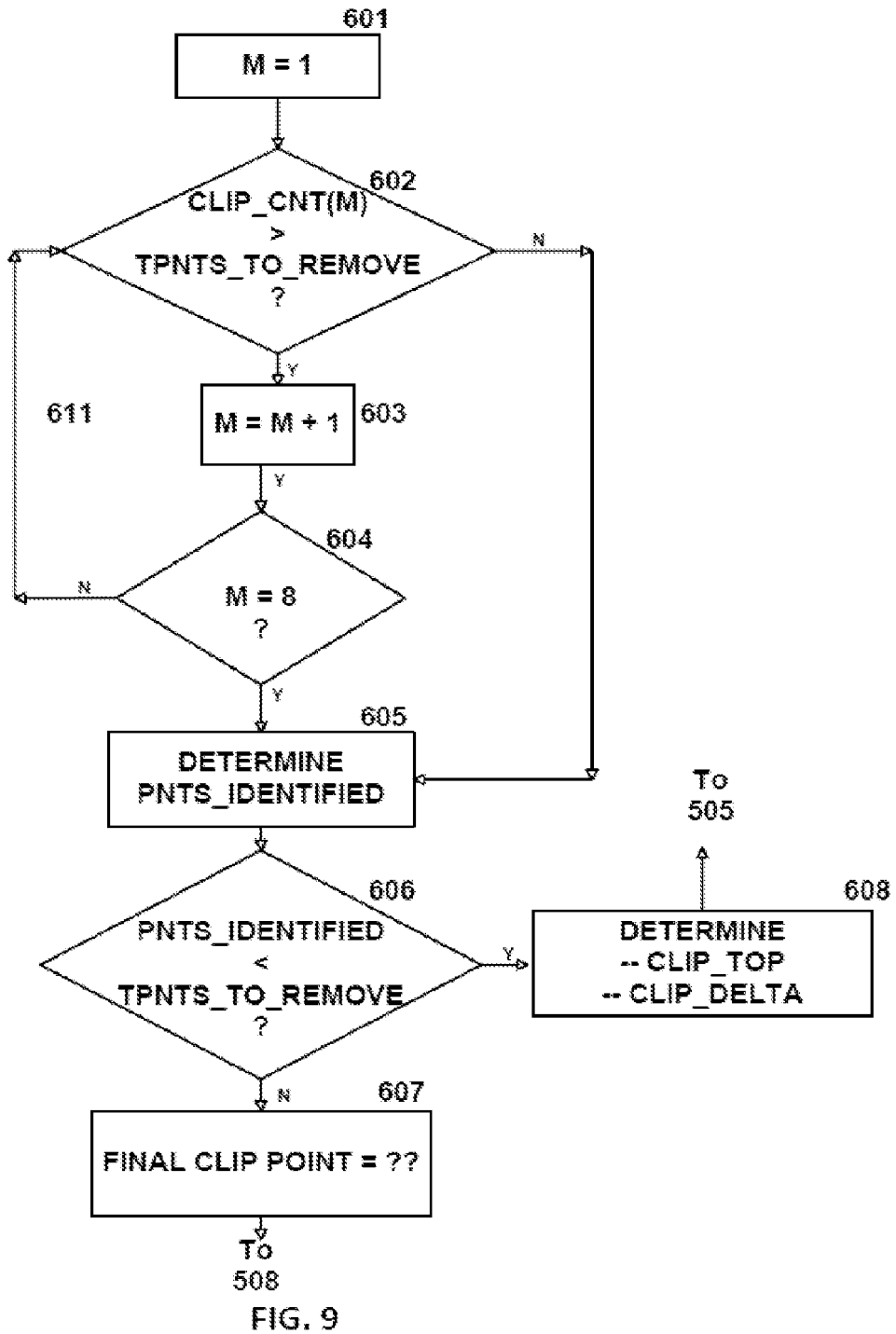
FIG. 9 is a flow diagram illustrating particular method of determining whether a final clip point has been identified in accordance with at least one embodiment of the present disclosure.

Referring to FIG. 9, at node 601 a variable M is set to one, where M is an index value between 1 and 8 that references one of the clip lines CLIP_LINE[1 . . . 8] (CL1-CL8). At node 602, a determination is made whether the number of points clipped by CLIP_LINE(M), CLIP_CNT(M), is greater than the total number of points to be clipped (TPNTS_TO_REMOVE). For example, if it is determined that CLIP_CNT[1], which is the number of points clipped by clip line CLIP_LINE[1], is greater than TPNTS_TO_REMOVE, then too many points are removed by CLIP_LINE[1], and flow proceeds to node 603. Otherwise, either the correct number of points, or too few points, have been clipped by CLIP_LINE [1] and flow proceeds to node 605. For example, referring to FIG. 8, the clip line CL1 is below the final clip line indicating that the number of points clipped by clip line CL1 is greater than TPNTS_TO_REMOVE, and flow will proceed to node 603.

At node 603, M is incremented by 1 and flow proceeds to node 604. For example, after evaluation of clip line CL1, M is incremented from one to two before proceeding to node 602. At node 604, it is determined if M is equal to eight. If so, flow proceeds to node 605. Otherwise, flow proceeds to node 602.

By example, during a second pass through the loop that includes nodes 602 and 604, it is determined that the number of points clipped by clip line CL2, see Table 1, is also greater than TPNTS_TO_REMOVE. As a result, M is incremented again, and the loop that includes nodes 602 and 604 is repeated for the value of M equal to three. During the third pass through node 602 it is determined that the number of points clipped by clip line CL3 is less than TPNTS_TO_REMOVE, indicating that clip line CL3 is either at or above the final clip line, as indicated at FIG. 8. Therefore, flow proceeds from node 604 to node 605.

At node 605, the variable PNTS_IDENTIFIED is adjusted from its current value of zero to CLIP_CNT(3). The value PNTS_IDENTIFIED indicates the number of currently identified points above the final clip line that will ultimately be clipped by the final clip line. Flow proceeds from node 605 to node 606.

At node 606 it is determined whether PNTS_IDENTIFIED is less than TPNTS_TO_REMOVE. If so, additional points need to be identified for clipping and flow proceeds to node 608, otherwise, the final clip line has been identified and flow proceeds to node 607.

At node 608, variables CLIP_TOP, and CLIP_DELTA are adjusted. CLIP_TOP is adjusted to correspond to the clip line associated with CLIP_CNT(M), which is the lowest clip line that clips either the same or fewer points as the FINAL CLIP POINT being determined, or is adjusted to CL8 if none of the clip lines clip CL1-CL7 clip the same or fewer points as the final clip line being determined. Therefore, in the present example, CLIP_TOP is adjusted to have the same value as CLIP_LINE_LOC(3), which corresponds to clip line CL3 of FIG. 8, and which is indicated at TABLE 1 to be 168,128. CLIP_DELTA is adjusted by Equation 6, where the number of points not yet identified for removal (TPOINTS_TO_REMOVE-PNTS_IDENTIFIED). By example, it is assumed that PNTS_IDENTIFIED is equal to CLIP_CNT(3), which by example has a value of 161,040, whereby the term TPOINTS_TO_REMOVE-PNTS_IDENTIFIED of Equation 6 evaluates as 414,720-161,040, which results in a rounded CLIP_DELTA of 991 ((414,720−161−040)/256+1). Flow proceeds from node 608 to node 505 of the flow diagram of FIG. 7.

Upon returning to node 505, a new plurality of clip lines, as indicated at TABLE 2, are determined based upon Equation 7, using the adjusted CLIP_DELTA value of 991 and the adjusted CLIP_TOP value of 168,128.

TABLE 2

| CLIP LINE | CLIP LINE LOCATION |
| --- | --- |
| CLIP_LINE[1] | 12480 |
| CLIP_LINE[2] | 90304 |
| CLIP_LINE[3] | 129216 |
| CLIP_LINE[4] | 148672 |
| CLIP_LINE[5] | 158400 |
| CLIP_LINE[6] | 163264 |
| CLIP_LINE[7] | 165696 |
| CLIP_LINE[8] | 166912 |

Figure 10:
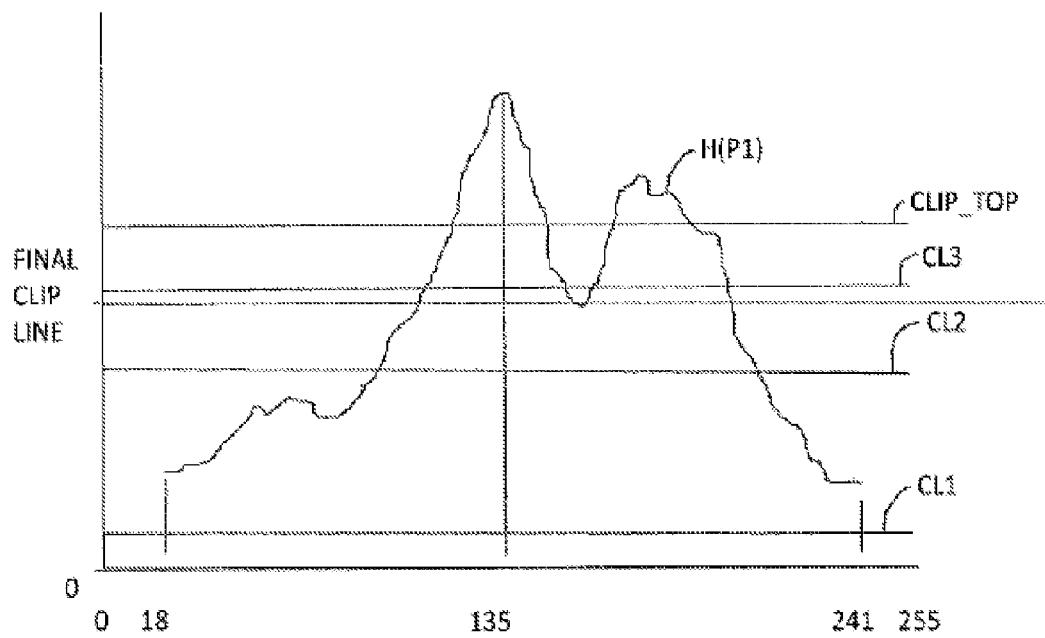
FIG. 10 is a graphical representation of the histogram of FIG. 4 illustrating another plurality of clip points in accordance with at least one embodiment of the present disclosure.

FIG. 10 illustrates the histogram for picture P1 along with a portion of the new plurality of clip lines, CL1 through CL4, identified at Table 2. The portion of the histogram above the clip line labeled CLIP_TOP represents the number of points of the histogram identified for final removal.

The loop of the combined flow diagrams of FIG. 7 and FIG. 9 that include nodes 601, 608, and 505 (FIG. 7) is repeated until PNTS_IDENTIFIED is greater than or equal to TPNTS_TO_REMOVE, whereby flow proceeds to node 607.

At node 607, the final clip point is set equal to the clip line associated with CLIP_CNT[M], which is either CL8, or one of clip lines CL1-CL7 that clips exactly the number of points indicated by TPNTS_TO_REMOVE. Flow proceeds to node 508 of FIG. 7 from node 607.

At node 508 an adjusted histogram H1 is determined by redistributing the points of the received histogram H[P1] that are above the clip line determined at node 606. For example, the histogram H1 can be determined by the histogram redistribution module 314 (FIG. 5), which represents a specific embodiment of the histogram redistribution module 125, redistributing clipped points of histogram H[P1].

At node 509 of the flow diagram of FIG. 7, the translation matrix TM1 is determined based upon the redistributed histogram. For example, referring to FIG. 1, the histogram H1 can represent the histogram determined by the histogram redistribution module 400 of FIG. 6 that represents a specific embodiment of the histogram redistribution module 125. One skilled in the art will recognize that there are many ways to determine a translation matrix based upon a particular histogram, though it has been observed that limiting the amount of change between the translation matrices of successive frames, as discussed with the specific embodiment of a translation matrix generation module 120, can result in limiting the perceived effects of enhancing noise when the contrast is adjusted.

Flow proceeds from node 509 to node 510, where the current video frame P1 has its contrast adjusted based upon the translation matrix TM1. One skilled in the art will appreciate that a different translation matrix is determined for each successive video frame, and, therefore, determining a particular translation matrix can be an iterative process in that a current video frame is translated using the previous video frame's translation matrix along with the current video frame's translation matrix.

Figure 11:
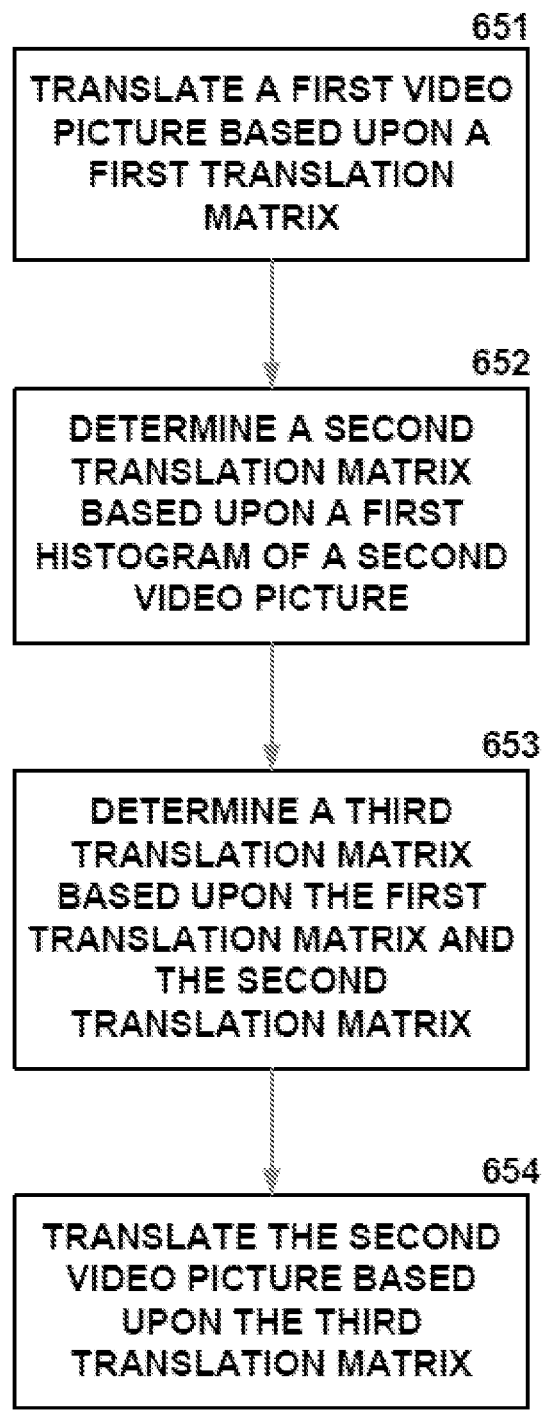
FIG. 11 is a block diagram illustrating an example system for implementing the video processor of FIG. 1 in accordance with at least one embodiment of the present disclosure.

FIG. 11 illustrates a method including blocks 651-654. At block 651 a first video picture is translated based upon a first translation matrix. For example: the first translation matrix can be a translation based upon a plurality of previous translation matrices that were used to translate previous video pictures. As previously described, the first translation matrix can be a statistical calculation, such as a moving average, of a translation matrix based upon the first video picture and the plurality of previous translation matrices.

At block 652, a second translation matrix is determined based upon a first histogram of a second video picture. In one embodiment the second translation matrix is determined using only the first histogram.

At block 653, a third translation matrix is determined based upon the first translation matrix and the second translation matrix. For example, the first translation matrix, which is used to transform the first video picture, and the second translation matrix, which is based upon the second video picture, can be used with a statistical calculation to determine the third matrix. The third matrix is used at block 654 to translation the second video picture.

Figure 12:
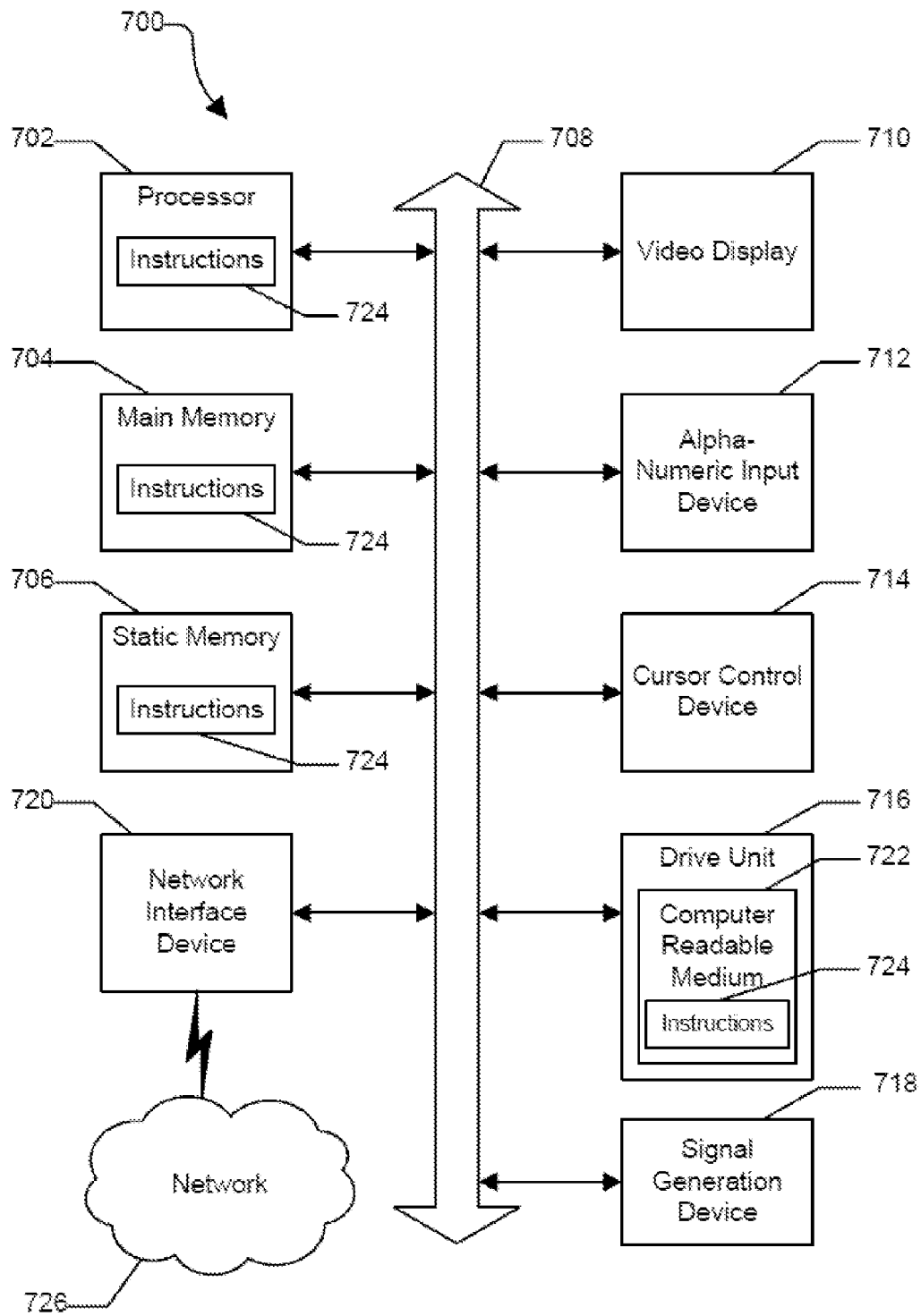
FIG. 12 is a block diagram illustrating a processing system in accordance with a particular embodiment.

FIG. 12 illustrates a processing system 700 in accordance with at least one embodiment of the present disclosure. The processing system 700 can include a set of instructions that can be executed to manipulate the processing system 700 to perform any one or more of the methods or functions disclosed herein. The processing system 700 may operate as a standalone device or may be connected, e.g., using a network, to other processor devices or peripheral devices.

In a networked deployment, the processor device may operate in the capacity of a server or as a client user computer in a server-client user network environment, or as a peer processor device in a peer-to-peer (or distributed) network environment. The processing system 700 can also be implemented as or incorporated into, for example, a portable display device.

The processing system 700 may include a processor 702, e.g., a central processing unit (CPU), a graphics processing unit (GPU), or both. The various embodiments described herein can reside at the processor 702, which can be integrated circuit, or be distributed amongst processing system 700. Moreover, the processing system 700 can include a main memory 704 and a static memory 706 that can communicate with each other via a bus 708. As shown, the processing system 700 may further include a video display unit 710, such as a liquid crystal display (LCD), an organic light emitting diode (OLED), a flat panel display, a solid state display, or a cathode ray tube (CRT). Additionally, the processing system 700 may include an input device 712, such as a keyboard, and a cursor control device 714, such as a mouse. The processing system 700 can also include a disk drive unit 716, a signal generation device 718, such as a speaker, and a network interface device 720.

In a particular embodiment, as depicted in FIG. 11, the disk drive unit 716 may include a computer readable storage device 722 in which one or more sets of instructions 724, e.g. software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the processing system 700. The main memory 704 and the processor 702 also may include computer readable media. The network interface device 720 can provide connectivity to a network 726, e.g., a wide area network (WAN), a local area network (LAN), or other network.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and processor devices. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented, in whole or in part, by software programs executable by a processor device. The present disclosure contemplates a computer readable storage device that includes instructions or receives and provides instructions for execution responsive to a propagated signal, so that a device connected to a network can communicate voice, video or data over the network 726. Further, the instructions 724 may be transmitted or received over the network 726 via the network interface device 720.

In one embodiment, rather than being software instructions that directly implement the functionality described herein, the instructions 724 instead can implement design instructions representative of a hardware implementation of the above-described functionality that are then synthesized to determine the electrical and electronic design for a processing device that implements the above-described invention. To illustrate, these hardware-design instructions can include register transfer level (RTL) instructions, Verilog instructions, and the like.

While the computer readable storage device is shown to be a single storage device, the computer readable storage device can include a single storage device or multiple storage devices, such as a centralized or distributed database, and/or associated caches and servers that store one or more sets of instructions. The term "computer readable storage device" shall also include any storage device that is capable of storing a set of instructions for execution by a processor or that causes a processor device to perform any one or more of the methods or operations disclosed herein.

In a particular embodiment, the computer readable storage device can include a solid-state memory such as a memory card or other package that houses one or more non-volatile read-only memories. Further, the computer readable storage device can be a random access memory or other volatile re-writeable memory. Additionally, the computer readable storage device can include a magneto-optical or optical medium. Accordingly, the disclosure is considered to include any one or more of a computer readable storage device or a distribution medium and other equivalents and successor media, in which data or instructions may be stored.

Other embodiments, uses, and advantages of the disclosure will be apparent to those skilled in the art from consideration of the specification and practice of the disclosure disclosed herein. The specification and drawings should be considered exemplary only, and the scope of the disclosure is accordingly intended to be limited only by the following claims and equivalents thereof.

What is claimed is:

1. A method comprising:
    at a video processor, determining a first histogram based upon a first video picture, the first histogram comprising a plurality of bins including a first bin and a second bin;
    determining for a first clip line of the first histogram a first total number of clipped points that includes a number of points of the first bin clipped by the first clip line and a number of points of the second bin clipped by the first clip line;
    determining for a second clip line of the first histogram a second total number of clipped points that includes a number of pixels of the first bin clipped by the second clip line and a number of points of the second bin clipped by the second clip line, wherein determining the first total number and the second total number occurs concurrently;
    determining a first translation matrix based upon the first histogram of the first video picture; and
    translating a second video picture based upon the first translation matrix.

2. The method of claim 1 wherein the first translation matrix is further based upon a second translation matrix that was generated prior to the second translation matrix.

3. The method of claim 2, wherein the second translation matrix is based upon a statistical calculation based upon a plurality of translation matrices.

4. The method of claim 3, wherein the statistical calculation is a moving average based upon the plurality of translation matrices.

5. The method of claim 1, wherein determining the first translation matrix includes:
    determining a final clip line of the histogram based upon a number of points of the first histogram determined to be clipped by one of the first clip line or the second clip line.

6. The method of claim 5 further comprising:
    determining the first and second clip lines based upon a number of histogram points of the first histogram to be redistributed.

7. The method of claim 6, wherein the number of histogram points to be redistributed is based upon a predefined percentage of the total number of points of the histogram.

8. The method of claim 7, wherein the predefined percentage is user programmable.

9. The method of claim 7, wherein the predefined percentage is a predefined variable percentage.

10. The method of claim 6, wherein determining the first and second clip lines includes determining a plurality of clip lines, including the first and second clip lines, based upon the number points of the first of histogram to be redistributed and the number of bins in the histogram.

11. The method of claim 6, wherein the first and second clip lines are adjacent clip lines of a plurality of clip lines, and a spacing between the first and second clip lines is based upon the number of histogram points to be redistributed divided by the number of bins in the histogram.

12. The method of claim 6, wherein the first and second clip lines are adjacent clip lines of a plurality of clip lines, and a spacing between adjacent clip lines of the plurality of clip lines is non-linear.

13. The method of claim 5, wherein the first clip line is a clip line above which too few points have been clipped, and determining the final clip line includes:
    concurrently determining at the integrated circuit a number of points of the first and second bin clipped by a third clip line and a fourth clip line, the third and fourth clip lines determined based upon a number of points clipped by the first clip line.

14. A video processing device comprising:
    a storage location to store a first translation matrix based upon a first video picture;
    a translation matrix generation module to determine a second translation matrix based upon a histogram of a second video picture, the translation module comprising a plurality of clip count modules including a first clip count module and a second count module; the first clip count module to determine a number of points of a first bin of the histogram clipped by a first clip line, and a number of points of a second bin of the histogram clipped by the first clip line; the second clip count module to determine a number of points of the first bin clipped by a second clip line, and a number of points of the second bin clipped by the first clip line;
a statistical calculation module to determine a third translation matrix based upon a statistical calculation that includes the first translation matrix and the second translation matrix; and
a picture translation module to translate the first video picture based upon the first translation matrix, and to translate the second video picture based upon the third translation matrix.

15. The device of claim 14, wherein the translation matrix generation module is to further determine a fourth translation matrix based upon a third video picture, and the statistical calculation module is further to determine a fifth translation matrix based upon the statistical calculation that includes the third translation matrix and the fourth translation matrix, and picture translation module to translate the third video picture based upon the fifth translation matrix.

16. The device of claim 14 further comprising:
a memory to store the histogram; and
a memory controller to read and provide the histogram information to each clipping module in response to reading the histogram information from the memory a single time.

17. A method comprising:
generating, at a first video processor, a first histogram based solely on a first video picture;
identifying a first plurality of clip lines for the first histogram;
concurrently determining, at the video processor device, a number of histogram points at a set of bins of the first histogram that are clipped by each clip line of the plurality of clip lines, wherein each clip line is applied to each bin of the set of bins, and wherein the number of histogram points clipped by each clip line is based upon the total number of points of the first histogram above that clip line;
determining, at the video processor device, a final clip line of the histogram based upon a number of points of the histogram determined to be clipped by a first clip line of the plurality of clip lines, wherein the final clip line is not one of the first plurality of clip lines; and
determining a translation matrix based upon the final clip line and the first histogram.

18. The method of claim 17 further comprising:
redistributing a plurality of histogram points clipped by the final clip line to define a second histogram.

19. The method of claim 17, further including:
determining the plurality of clip lines based upon a number of first histogram points to be redistributed.

20. A method comprising:
translating a first video picture based upon a first translation matrix;
determining a plurality of clip lines based upon a number of histogram points of a first histogram to be redistributed and the number of bins in the first histogram;
concurrently determining at an integrated circuit a number of points of the first histogram clipped by each clip line of a plurality of clip lines;
determining a final clip line of the histogram based upon a number of points of the first histogram determined to be clipped by a first clip line of the plurality of clip lines;
determining a second translation matrix based upon the first histogram of a second video picture;
determining a third translation matrix based upon the first translation matrix and the second translation matrix; and
translating the second video picture based upon the third translation matrix.

21. A method comprising:
translating a first video picture based upon a first translation matrix;
determining a plurality of clip lines based upon a number of histogram points of a first histogram to be redistributed, wherein the spacing between adjacent clip lines of the plurality of clip lines is based upon the number of points of the histogram points to be redistributed divided by the number of bins in the histogram;
concurrently determining at an integrated circuit a number of points of the first histogram clipped by each clip line of a plurality of clip lines;
determining a final clip line of the histogram based upon a number of points of the first histogram determined to be clipped by a first clip line of the plurality of clip lines;
determining a second translation matrix based upon the first histogram of a second video picture;
determining a third translation matrix based upon the first translation matrix and the second translation matrix; and
translating the second video picture based upon the third translation matrix.

22. A method comprising:
translating a first video picture based upon a first translation matrix;
concurrently determining at an integrated circuit a number of points of the first histogram clipped by each clip line of a plurality of clip lines;
determining a final clip line of the histogram based upon a number of points of the first histogram determined to be clipped by a first clip line of the plurality of clip lines, wherein the plurality of clip lines is a first plurality of clip lines, the first clip line is a clip line above which too few points have been clipped, and determining the final clip line includes:
concurrently determining at the integrated circuit a number of points of the first histogram clipped by each clip line of a second plurality of clip lines, the second plurality of bit lines determined based upon a number of points clipped by the first clip line; and
determining the final clip line of the histogram is further based upon a number of points of the first histogram determined to be clipped by a second clip line of the second plurality of clip lines
determining a second translation matrix based upon the first histogram of a second video picture;
determining a third translation matrix based upon the first translation matrix and the second translation matrix; and
translating the second video picture based upon the third translation matrix.

* * * * *